No. 654,245. Patented July 24, 1900.
L. GLASSER.
BICYCLE ATTACHMENT.
(Application filed Mar. 31, 1900.)
(No Model.)
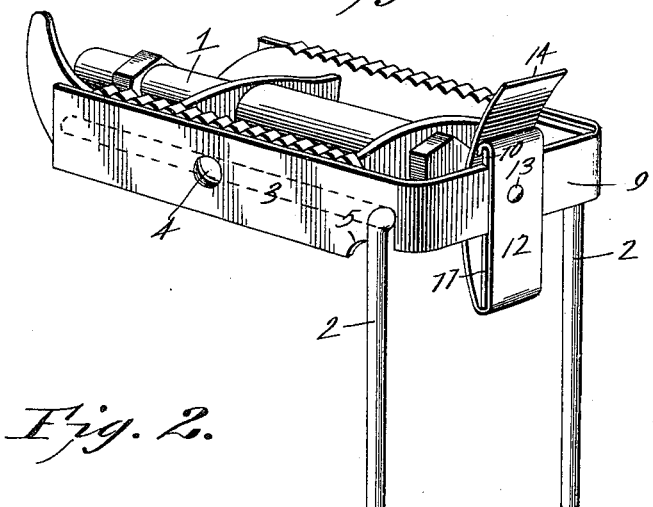
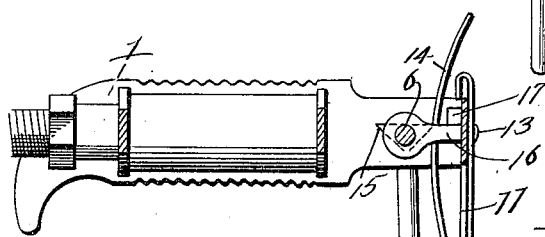
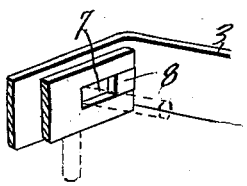
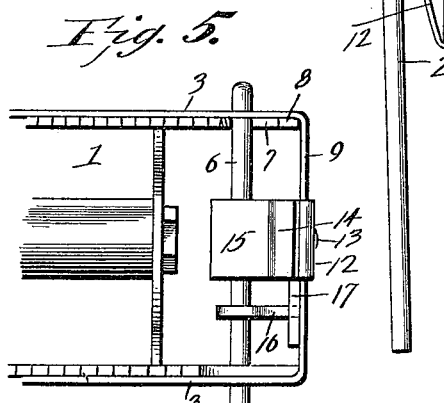
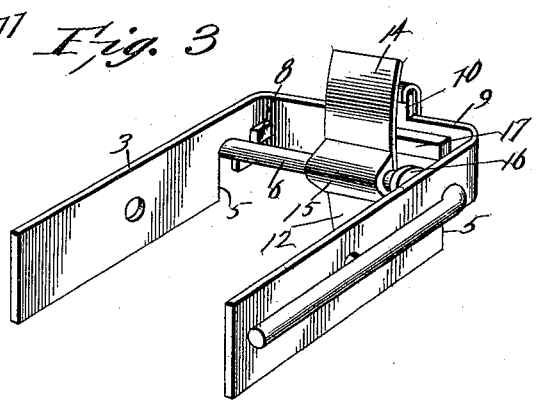
Witnesses
Ludwig Glasser Inventor
By his Attorneys,
THE NORRIS PETERS CO., PHOTO-LITHO., WASHINGTON, D. C.

UNITED STATES PATENT OFFICE.

LUDWIG GLASSER, OF OLEAN, NEW YORK.

BICYCLE ATTACHMENT.

SPECIFICATION forming part of Letters Patent No. 654,245, dated July 24, 1900.

Application filed March 31, 1900. Serial No. 10,967. (No model.)

*To all whom it may concern:*

Be it known that I, LUDWIG GLASSER, a citizen of the United States, residing at Olean, in the county of Cattaraugus and State of New York, have invented a new and useful Bicycle Attachment, of which the following is a specification.

This invention relates to bicycle-supports, and has for an object to provide an improved device of this character which is carried by one of the pedals in a folded position thereon and arranged to be tripped by the foot of the rider, so as to assume an upright position for engagement with the ground to support the bicycle and also arranged to be returned to its normal position by a movement of the foot of the rider, whereby the bicycle may be supported while the rider is in the saddle. It is furthermore designed to provide the device in the form of an attachment, so that it may be conveniently applied to a bicycle without requiring any material change in the pedal and without interfering with the usual operation thereof.
With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a bicycle-pedal having the improved support applied thereto and in its operative position. Fig. 2 is a central longitudinal sectional view thereof. Fig. 3 is a detail perspective view of the attachment removed from the pedal. Fig. 4 is a detail sectional perspective view illustrating one of the connections between the device and the pedal. Fig. 5 is a detail plan view, parts being broken away.

Corresponding parts in the several figures of the drawings are designated by like characters of reference.
Referring to the drawings, 1 designates any ordinary or common bicycle-pedal, having the substantially U-shaped support 2 pivotally or hingedly connected to the outer end thereof, so as to assume a vertical position, as shown in full lines, to engage the ground or floor in the operative position of the device to support a bicycle and also to be folded inwardly and upwardly into the plane of the pedal, as shown in dotted lines in Fig. 1 of the drawings. To connect this support to the pedal, there is provided a substantially U-shaped frame 3, the opposite sides of which embrace the respective longitudinal sides of the pedal and are connected thereto by means of suitable fastenings 4, which pass through alined perforations in the frame and the pedal. It is not necessary to form additional openings in the sides of the pedal, as the latter is always provided with an intermediate opening for the attachment of a toe-clip, as will be readily understood. Adjacent to the outer end of the frame and in the under edge of the opposite longitudinal sides thereof are formed the transverse slots or notches 5 for the reception of the transverse portion 6 of the support which forms the rock-shaft therefor. The outer end of each side of the pedal is provided with a longitudinal slot or bifurcation 7, which is designed to receive one of the ends of the rock-shaft, and the sides of the frame are provided with the inner lugs or projections 8, which are snugly received within the outer ends of the respective slots or bifurcations in the sides of the pedal to form a connection for the latter and the frame.

The transverse portion 9 of the frame is provided with an intermediate upstanding arm 10 and an opposite pendent arm 11, the opposite outer ends of which are embraced by a bowed spring-plate 12, that is secured to the transverse portion of the frame by means of a suitable fastening 13. The inner free portion 14 of the spring projects upwardly between the transverse portion of the frame and the rock-shaft to frictionally bear against a cam-shoulder 15, provided intermediate of the opposite ends of the rock-shaft, so as to yieldingly support the U-shaped support in its normal inoperative position, as best shown in Fig. 3 of the drawings. It will be noted that the free end of the spring projects above the upper side of the pedal, so that said spring may be pressed outwardly by the foot of the rider, whereby the former may be released from engagement with the cam 15, and thus permit of the support automatically dropping into position for use.

In the operative position of the support it inclines upwardly and inwardly, and to maintain it in this position the rock-shaft is provided with a radial lug or arm 16, which is designed to engage against the lower edge of a fixed shoulder 17, provided upon the inner side of the transverse end 9 of the frame, so as to limit the outward swing of the free end of the support and hold the latter in a fixed position.

From the foregoing description it will be seen that the support is carried by a frame, which may be conveniently applied to a pedal by forming a pair of slots in its outer end, and the device does not interfere with the operation of the pedal, and a toe-clip may be used while the support is in place. Also the support may be readily brought into position for use by the rider and without dismounting, and by striking the foot against the outer side of the support the latter will snap upwardly into its normal inoperative position by reason of the relative arrangement of the substantially U-shaped spring and the cam-shoulder carried by the rock-shaft, as will be readily appreciated.

What is claimed is—

1. The combination with a bicycle-pedal, of a rock-shaft mounted thereon, a lateral support carried by the rock-shaft, means for holding the support in its normal inoperative position, and an outwardly-directed trip carried solely by the holding means and arranged for engagement by the foot of the rider.

2. The combination with a bicycle-pedal, of a rock-shaft mounted thereon, a lateral support carried by the shaft, a cam also provided upon the shaft, a spring arranged in frictional engagement with the cam to hold the support in its normal inoperative position, and an upwardly-directed trip projecting above the plane of the upper side of the pedal, carried solely by the spring, and arranged for engagement by the foot of the rider.

3. A bicycle-support, comprising a frame for application to a pedal, a rock-shaft mounted upon the frame, a lateral supporting-arm carried by the shaft, a cam provided upon the shaft, a bowed spring carried by the frame and in frictional engagement with the cam to support the arm in its normal inoperative position, and one end of the spring being free and projected above the frame to form a trip for engagement by the foot of a rider.

4. A bicycle-support, comprising a substantially U-shaped frame for application to a pedal, a lateral rock-shaft mounted adjacent to the inner side of the transverse end of the frame, a lateral supporting-arm carried by the shaft, an intermediate cam also formed upon the shaft, and a bowed spring having one end secured to the transverse end of the frame, its intermediate convex portion being located upon the inner side of the frame and in frictional engagement with the cam, and its opposite free end being projected outwardly beyond the frame and forming a trip for engagement by the foot of a rider.

5. The combination with a bicycle-pedal, having longitudinal bifurcations formed in the outer ends of the opposite sides thereof, of a substantially U-shaped frame embracing the opposite sides of the pedal, a transverse rock-shaft mounted upon the frame and received within the bifurcations of the pedal, a lateral supporting-arm carried by the shaft, means for holding the arm in its normally-inoperative position, and inwardly-directed lugs or projections formed upon the inner faces of the opposite sides of the frame and received within the outer open ends of the respective bifurcations.

6. The combination with a bicycle-pedal, having longitudinal bifurcations formed in the outer ends of the opposite sides thereof, of a substantially U-shaped frame embracing the opposite sides of the pedal and connected thereto, each side of the frame being provided with a vertical notch or recess intersecting the adjacent bifurcation, a transverse rock-shaft mounted in the notches or recesses of the frame and also received within the bifurcations of the pedal, a lateral supporting-arm carried by the shaft, and means for holding the arm in its inoperative position.

7. A bicycle-support, comprising a substantially U-shaped frame for application to a bicycle-pedal, a rock-shaft mounted transversely of the frame and adjacent to the transverse end thereof, supporting-arms at opposite ends of the shaft, a cam provided intermediate of the shaft, a bowed spring carried by the transverse end of the frame and for frictional engagement with the cam, a lateral arm carried by the shaft, and a shoulder carried by the inner side of the transverse end of the frame and for engagement by the arm, in the operative position of the support.

8. The combination with a bicycle-pedal, having longitudinal slots or bifurcations formed in the outer ends of its opposite sides, of a substantially U-shaped frame embracing the pedal, fastenings connecting the frame to the pedal, a substantially U-shaped support, of which the transverse portion forms a rock-shaft mounted in transverse notches formed in the opposite sides of the frame and adjacent to the transverse outer end thereof, said rock-shaft also extending through the slots in the sides of the pedal, opposite lugs provided upon the opposite inner sides of the frame and snugly received within the slots outwardly from the shaft, a cam provided at an intermediate portion of the latter, a bowed spring carried by the transverse end of the frame and in frictional engagement with the cam, the upper free portion of the spring projecting above the upper side of the pedal to form a trip, a lateral arm carried by the rock-shaft, and a stop-shoulder carried by the inner side of the outer end of the frame, and for engagement by the arm.

In testimony that I claim the foregoing as my own I have hereto affixed my signature in the presence of two witnesses.

LUDWIG GLASSER.

Witnesses:
 J. H. THOMPSON,
 J. M. LARKIN.